United States Patent
Du et al.

(10) Patent No.: US 9,334,362 B2
(45) Date of Patent: *May 10, 2016

(54) INITIATOR COMPOSITION, UNSATURATED POLYESTER RESIN COMPOSITION COMPRISING SAME, AND METHOD FOR CURING RESIN

(71) Applicant: Wuhan Keda Marble Protective Materials Co., Ltd., Wuhan (CN)

(72) Inventors: Kunwen Du, Wuhan (CN); Kunwu Du, Wuhan (CN); Guofeng Qiu, Wuhan (CN); Panfeng Mao, Wuhan (CN); Liya Wang, Wuhan (CN)

(73) Assignee: WUHAN KEDA MARBLE PROTECTIVE MATERIALS CO., LTD., Wuhan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/495,877

(22) Filed: Sep. 24, 2014

(65) Prior Publication Data

US 2015/0011713 A1  Jan. 8, 2015

Related U.S. Application Data

(63) Continuation-in-part of application No. PCT/CN2013/074218, filed on Apr. 15, 2013.

(30) Foreign Application Priority Data

Apr. 19, 2012 (CN) .......................... 2012 1 0116113

(51) Int. Cl.
C08F 4/38 (2006.01)
C08G 63/91 (2006.01)
C08F 299/04 (2006.01)
C08F 8/00 (2006.01)

(52) U.S. Cl.
CPC ................ *C08G 63/918* (2013.01); *C08F 4/38* (2013.01); *C08F 8/00* (2013.01); *C08F 299/045* (2013.01)

(58) Field of Classification Search
None
See application file for complete search history.

(56) References Cited

U.S. PATENT DOCUMENTS 4,001,348 A * 1/1977 Selbeck et al. ................. 525/20
4,873,274 A * 10/1989 Cummings et al. ........... 523/500
6,194,525 B1 * 2/2001 Ortiz et al. ...................... 525/42

* cited by examiner

*Primary Examiner* — Robert C Boyle
(74) *Attorney, Agent, or Firm* — Matthias Scholl, PC; Matthias Scholl

(57) ABSTRACT

An initiator composition, including: at least two compounds represented by the chemical formula of R—CO—O—O—CO—R and a compound represented by the chemical formula of $R_1$—CO—O—O—$R_2$, where R represents a $C_2$-$C_{12}$ alkyl or a $C_6$-$C_{10}$ aryl or substituted aryl, $R_1$ represents a $C_1$-$C_{10}$ alkyl or a $C_6$-$C_{10}$ aryl, and $R_2$ represents a $C_1$-$C_{10}$ alkyl.

17 Claims, 2 Drawing Sheets

US 9,334,362 B2

INITIATOR COMPOSITION, UNSATURATED POLYESTER RESIN COMPOSITION COMPRISING SAME, AND METHOD FOR CURING RESIN

CROSS-REFERENCE TO RELATED APPLICATIONS

This application is a continuation-in-part of International Patent Application No. PCT/CN2013/074218 with an international filing date of Apr. 15, 2013, designating the United States, and further claims priority benefits to Chinese Patent Application No. 201210116113.9 filed Apr. 19, 2012. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

1. Field of the Invention

The invention relates to an initiator composition, a method for curing a resin, and a composition comprising the initiator composition and an unsaturated polyester resin.

2. Description of the Related Art

A typical curing system for unsaturated polyester resins at room temperature employs a ketone peroxide such as methyl ethyl ketone peroxide or cyclohexanone peroxide as an initiator and a cobalt salt as an accelerator, or employs benzoyl peroxide as an initiator and tertiary amine as an accelerator. However, such a curing system can only cure unsaturated polyester resins at room temperature, and if the temperature is not more than 15° C., the gel time is very long, the curing speed and the degree of curing are very low, and the mechanical properties of the cured substance leaves much to be desired.

SUMMARY OF THE INVENTION

In view of the above-described problems, it is one objective of the invention to provide an initiator composition that can accelerate the curing speed of unsaturated polyester resins at different temperature particularly at temperatures no more than 15° C., and improve the mechanical properties of the cured substances.

It is another objective of the invention to provide a method for curing an unsaturated polyester resin.

It is still another objective of the invention to provide a composition comprising an unsaturated polyester resin and an initiator composition.

The curing of unsaturated polyester resins includes three stages: gelation, shaping, and aging. The gelation means the resins transform from a viscous flow state to a semisolid gel. The shaping means the resins transform from the semisolid gel to have certain hardness and fixed shape. The aging means the shaped resins are being hardened naturally to have stable chemical and physical properties. The aging generally last for 3-10 days.

The principle of the curing of unsaturated polyester resins is summarized as follows. An initiator can initiate the chain initiation of unsaturated polyester resins. The initiator is a compound comprising a weak bond and tends to decompose into free radicals. In the presence of thermal or radiant energy, the weak bond breaks and the initiator decomposes to yield two free radicals. The resulting free radicals attack the unsaturated polyester resins to produce radical monomers thereby accelerating the curing of the resins.

To achieve the above objective, in accordance with one embodiment of the invention, there is provided an initiator composition comprising: at least two compounds represented by a chemical formula of R—CO—O—O—CO—R and a compound represented by a chemical formula of $R_1$—CO—O—O—$R_2$, where R represents a $C_2$-$C_{12}$ alkyl or a $C_6$-$C_{10}$ aryl or substituted aryl, $R_1$ represents a $C_1$-$C_{10}$ alkyl or a $C_6$-$C_{10}$ aryl, and $R_2$ represents a $C_1$-$C_{10}$ alkyl.

In a class of this embodiment, the two compounds represented by the formula of R—CO—O—O—CO—R are a diacyl peroxide selected from the group consisting of benzoyl peroxide, 2,4-dichlorobenzene acyl peroxide, lauroyl peroxide, and diacetyl peroxide, and the compound represented by the formula of $R_1$—CO—O—O—$R_2$ is a carboxylic ester peroxide selected from the group consisting of tert-butyl peroxybenzoate (TBPB), tert-butyl peroxy diethyl acetate, t-butyl peroctoate (TBPO).

In a class of this embodiment, the initiator composition comprises between 50 and 95 parts by weight of the two compounds represented by the formula of R—CO—O—O—CO—R and between 5 and 50 parts by weight of the compound represented by the formula of $R_1$—CO—O—O—$R_2$.

In a class of this embodiment, the initiator composition comprises between 75 and 95 parts by weight of the two compounds represented by the formula of R—CO—O—O—CO—R and between 5 and 25 parts by weight of the compound represented by the formula of $R_1$—CO—O—O—$R_2$.

In a class of this embodiment, the initiator composition comprises 75 parts by weight of the diacyl peroxide and 25 parts by weight of the carboxylic ester peroxide. Specifically, the diacyl peroxide comprises 25 parts by weight of the benzoyl peroxide, 20 parts by weight of 2,4-dichlorobenzene acyl peroxide, 15 parts by weight of lauroyl peroxide, and 15 parts by weight of diacetyl peroxide, and the carboxylic ester peroxide is t-butyl peroctoate (TBPO).

In a class of this embodiment, the initiator composition comprises 95 parts by weight of the diacyl peroxide and 5 parts by weight of the carboxylic ester peroxide. Specifically, the diacyl peroxide comprises 40 parts by weight of the benzoyl peroxide, 30 parts by weight of 2,4-dichlorobenzene acyl peroxide, and 25 parts by weight of lauroyl peroxide, and the carboxylic ester peroxide is tert-butyl peroxy diethyl acetate.

In a class of this embodiment, the initiator composition comprises 90 parts by weight of the diacyl peroxide and 10 parts by weight of the carboxylic ester peroxide. Specifically, the diacyl peroxide comprises 40 parts by weight of the benzoyl peroxide and 50 parts by weight of 2,4-dichlorobenzene acyl peroxide, and the carboxylic ester peroxide is tert-butyl peroxybenzoate (TBPB).

In a class of this embodiment, the initiator composition further comprises a compound represented by a formula of $R_1$—O—O—$R_2$, where $R_1$ and $R_2$ independently, at each occurrence, represents a $C_1$-$C_{10}$ alkyl or a $C_6$-$C_{10}$ aryl. The compound represented by the formula of $R_1$—O—O—$R_2$ is an alkyl peroxide selected from the group consisting of dicumyl peroxide, di-t-butyl peroxide, and t-butyl cumyl peroxide. The initiator composition comprises between 75 and 90 parts by weight of the two compounds represented by the formula of R—CO—O—O—CO—R, between 5 and 20 parts by weight of the compound represented by the formula of $R_1$—CO—O—O—$R_2$, and between 5 and 20 parts by weight of the compound represented by the formula of $R_1$—O—O—$R_2$.

In a class of this embodiment, the diacyl peroxide is 80 parts by weight, the carboxylic ester peroxide is 10 parts by weight, and the alkyl peroxide is 10 parts by weight, the diacyl peroxide comprises 40 parts by weight of benzoyl peroxide and 40 parts by weight of 2,4-dichlorobenzene acyl peroxide, the carboxylic ester peroxide is tert-butyl peroxybenzoate, and the alkyl peroxide is dicumyl peroxide.

The invention also provides a method for curing an unsaturated polyester resin comprising adding the initiator composition to the unsaturated polyester resin. The unsaturated polyester resin is selected from the group consisting of phthalandione type unsaturated polyester resin, isophthalic unsaturated polyester resin, bisphenol A-type unsaturated polyester resin, dicyclopentadiene unsaturated polyester resin.

Still, the invention provides a composition comprising an unsaturated polyester resin, an initiator composition, an inhibitor, and an accelerator.

In a class of this embodiment, the inhibitor is selected from the group consisting of hydroquinone, 2,5-di-tert-butyl hydroquinone, methyl hydroquinone, p-benzoquinone, 4-tert-butylcatechol, and the accelerator is selected from the group consisting of N,N-dimethyl aniline, N,N-diethylaniline, N,N-dimethyl-p-toluidine, N-methyl-N-hydroxyethyl aniline, N-methyl-N-hydroxyethyl p-toluidine, N-methyl-N-hydroxypropyl p-toluidine, N,N-dihydroxyethyl aniline, and a homologue thereof.

In a class of this embodiment, the composition comprises 100 parts by weight of the unsaturated polyester resin, between 0.3 and 3 parts by weight of the initiator composition, between 0.01 and 0.1 part by weight of the inhibitor, and between 0.1 and 1 part by weight of the accelerator.

In a class of this embodiment, the composition comprises 100 parts by weight of the unsaturated polyester resin, between 0.5 and 2 parts by weight of the initiator composition, between 0.02 and 0.08 part by weight of the inhibitor, and between 0.2 and 0.8 part by weight of the accelerator.

In a class of this embodiment, the composition comprises 100 parts by weight of the unsaturated polyester resin, 1.5 parts by weight of the initiator composition, 0.03 part by weight of the inhibitor, and 0.5 part by weight of the accelerator.

Advantages according to embodiments of the invention are summarized as follows: the initiator composition can accelerate the curing speed of unsaturated polyester resins at different temperature particularly at temperatures no more than 15° C., and improve the mechanical properties of the cured substances.

BRIEF DESCRIPTION OF THE DRAWINGS

The invention is described herein below with reference to accompanying drawings, in which.

DETAILED DESCRIPTION OF THE EMBODIMENTS

Figure 1:
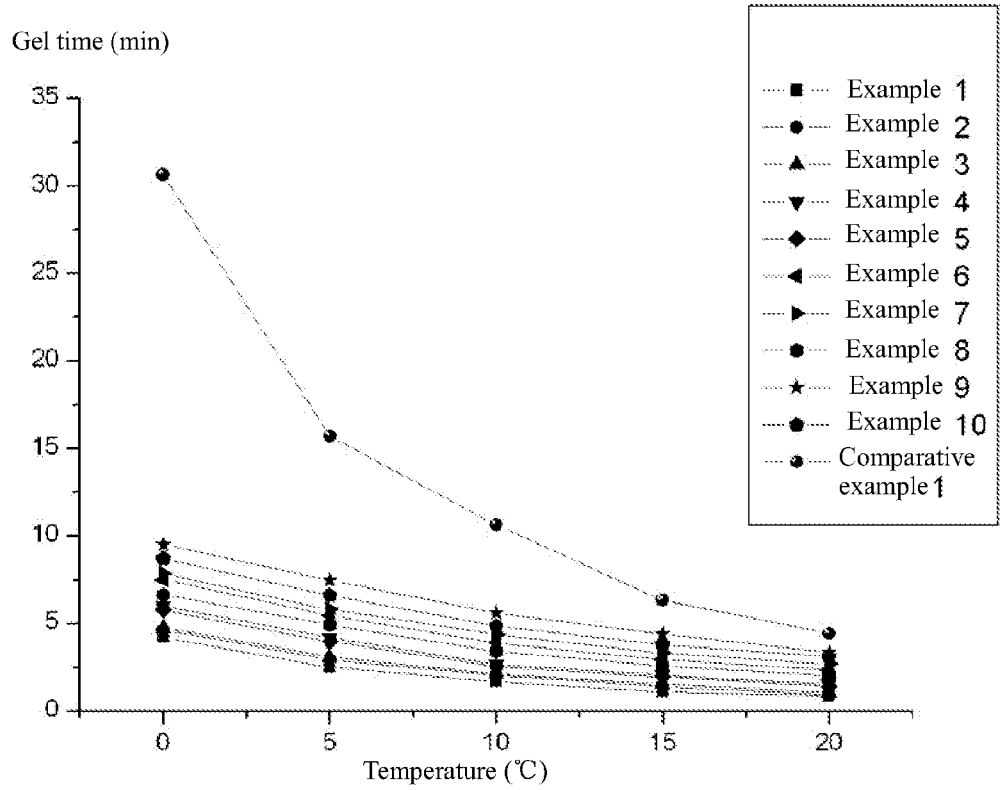
FIG. 1 is a curve chart of a gel time of unsaturated polyester resins initiated by an initiator composition of the invention at different temperatures.

For further illustrating the invention, experiments detailing an initiator composition, a method for curing a resin, and a composition comprising the initiator composition and an unsaturated polyester resin are described below. It should be noted that the following examples are intended to describe and not to limit the invention.

Experiments show that diacyl peroxides comprising benzoyl peroxide, 2,4-dichlorobenzene acyl peroxide, lauroyl peroxide, and diacetyl peroxide have a short half time and low critical temperature, which can shorten the gel time of unsaturated polyester resins.

The carboxylic ester peroxides comprising tert-butyl peroxybenzoate (TBPB), tert-Butyl peroxy diethyl acetate, t-butyl peroctoate (TBPO) have a high critical temperature, which can shorten the shaping time (also called the post curing time) of unsaturated polyester resins.

The alkyl peroxides comprising dicumyl peroxide, di-t-butyl peroxide, t-butyl cumyl peroxide have a high critical temperature, which can shorten the curing time (which is a total of the gel time and the post curing time) of unsaturated polyester resins.

The unsaturated polyester resins involved in this invention are formed by the polycondensation of unsaturated dicarboxylic acids (anhydrides), saturated dicarboxylic acids (anhydrides), and diols or polyols. After the polycondensation, a diluent such as styrene, an inhibitor, and an accelerator are added to the resins, thereby producing a liquid pre-accelerated unsaturated polyester resin (the product can be purchased from the market).

The pre-accelerated unsaturated polyester resin is selected from the group consisting of phthalandione type unsaturated polyester resin, isophthalic unsaturated polyester resin, bisphenol A-type unsaturated polyester resin, dicyclopentadiene unsaturated polyester resin, hexachloro-endo-methylenetetrahydrophthalic acid-based unsaturated polyester acetate resin, vinyl ester resin, and allyl resin.

The pre-accelerated unsaturated polyester resin is mainly applied to but is not limited to artificial marble, artificial agate, putty, cement, bonding agent, and concrete, with a number-average molecular weight of 1000-10000, preferably, 1000-6000, and more preferably, 1000-3000.

The curing process of the invention is summarized as follows. 0.3-3.0 parts by weight of the initiator composition of the invention are added to 100 parts by weight of the pre-accelerated unsaturated polyester resin and mixed. In contrast to conventional initiators, the initiator composition can accelerate the curing speed of unsaturated polyester resins at different temperature particularly at temperatures no more than 15° C., and improve the mechanical properties of the cured substances.

The initiator composition comprises at least two compounds represented by a formula of R—CO—O—O—CO—R and a compound represented by a formula of $R_1$—CO—O—O—$R_2$, where R represents a $C_2$-$C_{12}$ alkyl or a $C_6$-$C_{10}$ aryl or substituted aryl, $R_1$ represents a $C_1$-$C_{10}$ alkyl or a $C_6$-$C_{10}$ aryl, and $R_2$ represents a $C_1$-$C_{10}$ alkyl.

The two compounds represented by the formula of R—CO—O—O—CO—R are a diacyl peroxide selected from the group consisting of benzoyl peroxide, 2,4-dichlorobenzene acyl peroxide, lauroyl peroxide, and diacetyl peroxide, and the compound represented by the formula of $R_1$—CO—O—O—$R_2$ is a carboxylic ester peroxide selected from the group consisting of tert-butyl peroxybenzoate (TBPB), tert-butyl peroxy diethyl acetate, t-butyl peroctoate (TBPO).

The initiator composition comprises between 50 and 95 parts by weight of the two compounds represented by the formula of R—CO—O—O—CO—R and between 5 and 50 parts by weight of the compound represented by the formula of $R_1$—CO—O—O—$R_2$.

The initiator composition comprises between 75 and 95 parts by weight of the two compounds represented by the formula of R—CO—O—O—CO—R and between 5 and 25 parts by weight of the compound represented by the formula of $R_1$—CO—O—O—$R_2$.

The initiator composition comprises 75 parts by weight of the diacyl peroxide and 25 parts by weight of the carboxylic ester peroxide. Specifically, the diacyl peroxide comprises 25 parts by weight of the benzoyl peroxide, 20 parts by weight of 2,4-dichlorobenzene acyl peroxide, 15 parts by weight of lauroyl peroxide, and 15 parts by weight of diacetyl peroxide, and the carboxylic ester peroxide is t-butyl peroctoate (TBPO).

The initiator composition comprises 95 parts by weight of the diacyl peroxide and 5 parts by weight of the carboxylic ester peroxide. Specifically, the diacyl peroxide comprises 40 parts by weight of the benzoyl peroxide, 30 parts by weight of 2,4-dichlorobenzene acyl peroxide, and 25 parts by weight of lauroyl peroxide, and the carboxylic ester peroxide is tert-butyl peroxy diethyl acetate.

The initiator composition comprises 90 parts by weight of the diacyl peroxide and 10 parts by weight of the carboxylic ester peroxide. Specifically, the diacyl peroxide comprises 40 parts by weight of the benzoyl peroxide and 50 parts by weight of 2,4-dichlorobenzene acyl peroxide, and the carboxylic ester peroxide is tert-butyl peroxybenzoate (TBPB).

The initiator composition further comprises a compound represented by a formula of $R_1$—O—O—$R_2$, where $R_1$ and $R_2$ independently, at each occurrence, represents a $C_1$-$C_{10}$ alkyl or a $C_6$-$C_{10}$ aryl.

The compound represented by the formula of $R_1$—O—O—$R_2$ is an alkyl peroxide selected from the group consisting of dicumyl peroxide, di-t-butyl peroxide, and t-butyl cumyl peroxide.

The initiator composition comprises between 75 and 90 parts by weight of the two compounds represented by the formula of R—CO—O—O—CO—R, between 5 and 20 parts by weight of the compound represented by the formula of $R_1$—CO—O—O—$R_2$, and between 5 and 20 parts by weight of the compound represented by the formula of $R_1$—O—O—$R_2$.

The diacyl peroxide is 80 parts by weight, the carboxylic ester peroxide is 10 parts by weight, and the alkyl peroxide is 10 parts by weight, the diacyl peroxide comprises 40 parts by weight of benzoyl peroxide and 40 parts by weight of 2,4-dichlorobenzene acyl peroxide, the carboxylic ester peroxide is tert-butyl peroxybenzoate, and the alkyl peroxide is dicumyl peroxide.

The initiator composition is used for the curing of unsaturated polyester resins. The unsaturated polyester resins are selected from the group consisting of phthalandione type unsaturated polyester resin, isophthalic unsaturated polyester resin, bisphenol A-type unsaturated polyester resin, dicyclopentadiene unsaturated polyester resin, hexachloro-endo-methylenetetrahydrophthalic acid-based unsaturated polyester acetate resin, vinyl ester resin, and allyl resin.

A composition comprises an unsaturated polyester resin, an inhibitor, an accelerator, and the above-mentioned initiator composition.

The inhibitor is selected from the group consisting of hydroquinone, 2,5-di-tert-butyl hydroquinone, methyl hydroquinone, p-benzoquinone, 4-tert-butylcatechol, the accelerator is selected from the group consisting of N,N-dimethyl aniline, N,N-diethylaniline, N,N-dimethyl-p-toluidine, N-methyl-N-hydroxyethyl aniline, N-methyl-N-hydroxyethyl p-toluidine, N-methyl-N-hydroxypropyl p-toluidine, N,N-dihydroxyethyl aniline, and a homologue thereof.

In one example, the composition comprises 100 parts by weight of the unsaturated polyester resin, between 0.3 and 3 parts by weight of the initiator composition, between 0.01 and 0.1 part by weight of the inhibitor, and between 0.1 and 1 part by weight of the accelerator.

In one example, the composition comprises 100 parts by weight of the unsaturated polyester resin, between 0.5 and 2 parts by weight of the initiator composition, between 0.02 and 0.08 part by weight of the inhibitor, and between 0.2 and 0.8 part by weight of the accelerator.

In one example, the composition comprises 100 parts by weight of the unsaturated polyester resin, 1.5 parts by weight of the initiator composition, 0.03 part by weight of the inhibitor, and 0.5 part by weight of the accelerator.

It should be noted that the addition amount of the initiator composition, the inhibitor, and the accelerator is determined by the construction requirements. Specifically, when the temperature is over 25° C., the initiator composition and the accelerator are relatively increased, and the inhibitor is relatively decreased. When the temperature is below 25° C., the initiator composition and the accelerator are relatively decreased, and the inhibitor is relatively increased.

The following are some examples for the initiator composition of the invention.

Initiator composition No. 1 (by weight), total weight is 100 parts:
 benzoyl peroxide: 40 parts by weight;
 2,4-dichlorobenzene acyl peroxide: 50 parts by weight;
 tert-butyl peroxybenzoate (TBPB): 10 parts by weight.

Initiator composition No. 2 (by weight), total weight is 100 parts:
 benzoyl peroxide: 40 parts by weight;
 2,4-dichlorobenzene acyl peroxide: 30 parts by weight;
 lauroyl peroxide: 25 parts by weight;
 tert-butyl peroxy diethyl acetate: 5 parts by weight;

Initiator composition No. 3 (by weight), total weight is 100 parts:
 benzoyl peroxide: 25 parts by weight;
 2,4-dichlorobenzene acyl peroxide: 20 parts by weight;
 lauroyl peroxide: 15 parts by weight;
 diacetyl peroxide: 15 parts by weight;
 t-butyl peroctoate (TBPO): 25 parts by weight.

Initiator composition No. 4 (by weight), total weight is 100 parts:
 benzoyl peroxide: 20 parts by weight;
 lauroyl peroxide: 30 parts by weight;
 t-butyl peroctoate (TBPO): 50 parts by weight.

Initiator composition No. 5 (by weight), total weight is 100 parts:
 benzoyl peroxide: 40 parts by weight;
 2,4-dichlorobenzene acyl peroxide: 40 parts by weight;
 tert-butyl peroxybenzoate: 10 parts by weight;
 dicumyl peroxide: 10 parts by weight.

Initiator composition No. 6 (by weight), total weight is 100 parts:
  benzoyl peroxide: 30 parts by weight;
  diacetyl peroxide: 30 parts by weight;
  lauroyl peroxide: 20 parts by weight;
  tert-butyl peroxybenzoate: 4 parts by weight;
  tert-butyl peroxy diethyl acetate: 6 parts by weight;
  di-t-butyl peroxide: 7 parts by weight;
  dicumyl peroxide: 3 parts by weight.

Initiator composition No. 7 (by weight), total weight is 100 parts:
  benzoyl peroxide: 35 parts by weight;
  diacetyl peroxide: 40 parts by weight;
  tert-butyl peroxybenzoate: 5 parts by weight;
  di-t-butyl peroxide: 20 parts by weight;

Initiator composition No. 8 (by weight), total weight is 100 parts:
  benzoyl peroxide: 30 parts by weight;
  diacetyl peroxide: 30 parts by weight;
  lauroyl peroxide: 20 parts by weight;
  2,4-dichlorobenzene acyl peroxide: 10 parts by weight;
  tert-butyl peroxybenzoate: 5 parts by weight;
  di-t-butyl peroxide: 5 parts by weight.

Initiator composition No. 9 (by weight), total weight is 100 parts:
  benzoyl peroxide: 35 parts by weight;
  diacetyl peroxide: 40 parts by weight;
  tert-butyl peroxybenzoate: 5 parts by weight;
  tert-butyl peroxy diethyl acetate: 10 parts by weight;
  t-butyl peroctoate: 5 parts by weight;
  di-t-butyl peroxide: 5 parts by weight.

Initiator composition No. 10 (by weight), total weight is 100 parts:
  benzoyl peroxide: 35 parts by weight;
  diacetyl peroxide: 40 parts by weight;
  tert-butyl peroxybenzoate: 5 parts by weight;
  di-t-butyl peroxide: 8 parts by weight;
  dicumyl peroxide: 7 parts by weight;
  t-butyl cumyl peroxide: 5 parts by weight.

EXAMPLE 1

At 0° C., 5° C., 10° C., 15° C., and 20° C., 100 g of o-type unsaturated polyester resin No. 911 from Jiangsu Yabang Coating Co., Ltd., 0.03 g of hydroquinone (technical grade, inhibitor), and 0.5 g of N,N-dimethyl p-toluidine (technical grade, accelerator) were uniformly mixed. Thereafter, 1.5 g of the initiator composition No. 1 was added to the mixture, and the gel time and the curing time of the mixture were measured according to Chinese National Standard GB/T 7193-2008. The results are listed in Table 1.

The cured resin having a temperature of 5° C. was allowed to stand at 5° C. for 96 hours (this is an aging stage). Thereafter, the Barcol hardness of the cured resin was measured using a Barcol hardmeter (Beijing Shidaishanfeng Technology Co., HBA-1) according to Chinese National Standard GB/T 3854-2005, the bending strength of the cured resin was measured using a computer-controlled electronic universal testing machine (Shenzhen Reger Instrument Co., Ltd, RGM-100) according to Chinese National Standard GB/T 2570-1995, and the impact strength of the cured resin was measured using an electronic combination-type impact testing machine (Chengde Jingmi Precision Testing Machine Co., Ltd., XJC-25D) according to Chinese National Standard GB/T 2571-1995. The results are listed in Table 2.

EXAMPLE 2

The experimental conditions and operations are the same as that in Example 1 except that the initiator composition No. 2 is substituted for the initiator composition No. 1. The gel time and curing time at different temperatures are listed in Table 1, and the Barcol hardness, the bending strength, and the impact strength of the cured resin at 5° C. are listed in Table 2.

EXAMPLE 3

The experimental conditions and operations are the same as that in Example 1 except that the initiator composition No. 3 is substituted for the initiator composition No. 1. The gel time and curing time at different temperatures are listed in Table 1, and the Barcol hardness, the bending strength, and the impact strength of the cured resin at 5° C. are listed in Table 2.

EXAMPLE 4

The experimental conditions and operations are the same as that in Example 1 except that the initiator composition No. 4 is substituted for the initiator composition No. 1. The gel time and curing time at different temperatures are listed in Table 1, and the Barcol hardness, the bending strength, and the impact strength of the cured resin at 5° C. are listed in Table 2.

EXAMPLE 5

The experimental conditions and operations are the same as that in Example 1 except that the initiator composition No. 5 is substituted for the initiator composition No. 1. The gel time and curing time at different temperatures are listed in Table 1, and the Barcol hardness, the bending strength, and the impact strength of the cured resin at 5° C. are listed in Table 2.

EXAMPLE 6

The experimental conditions and operations are the same as that in Example 1 except that the initiator composition No. 6 is substituted for the initiator composition No. 1. The gel time and curing time at different temperatures are listed in Table 1, and the Barcol hardness, the bending strength, and the impact strength of the cured resin at 5° C. are listed in Table 2.

EXAMPLE 7

The experimental conditions and operations are the same as that in Example 1 except that the initiator composition No. 7 is substituted for the initiator composition No. 1. The gel time and curing time at different temperatures are listed in Table 1, and the Barcol hardness, the bending strength, and the impact strength of the cured resin at 5° C. are listed in Table 2.

EXAMPLE 8

The experimental conditions and operations are the same as that in Example 1 except that the initiator composition No. 8 is substituted for the initiator composition No. 1. The gel time and curing time at different temperatures are listed in Table 1, and the Barcol hardness, the bending strength, and the impact strength of the cured resin at 5° C. are listed in Table 2.

EXAMPLE 9

The experimental conditions and operations are the same as that in Example 1 except that the initiator composition No. 9 is substituted for the initiator composition No. 1. The gel time and curing time at different temperatures are listed in Table 1, and the Barcol hardness, the bending strength, and the impact strength of the cured resin at 5° C. are listed in Table 2.

EXAMPLE 10

The experimental conditions and operations are the same as that in Example 1 except that the initiator composition No. 10 is substituted for the initiator composition No. 1. The gel time and curing time at different temperatures are listed in Table 1, and the Barcol hardness, the bending strength, and the impact strength of the cured resin at 5° C. are listed in Table 2.

COMPARATIVE EXAMPLE 1

The experimental conditions and operations are the same as that in Example 1 except that benzoperoxide (technical grade) is substituted for the initiator composition No. 1. The gel time and curing time at different temperatures are listed in Table 1, and the Barcol hardness, the bending strength, and the impact strength of the cured resin at 5° C. are listed in Table 2.

TABLE 1

Gel time and curing time at different temperatures

| Temperature | Items | Example 1 | Example 2 | Example 3 | Example 4 | Example 5 | Example 6 | Example 7 | Example 8 | Example 9 | Example 10 | Comparative example 1 |
|---|---|---|---|---|---|---|---|---|---|---|---|---|
| 0° C. | Gel time | 4'15" | 4'40" | 4'48" | 5'59" | 5'44" | 7'30" | 7'50" | 6'38" | 9'30" | 8'42" | 30'40" |
|  | Curing time | 20'23" | 21'47" | 22'01" | 23'05" | 10'49" | 12'35" | 12'56" | 11'44" | 13'35" | 13'15" | Not cured |
| 5° C. | Gel time | 2'31" | 2'57" | 3'07" | 4'10" | 3'55" | 5'27" | 5'47" | 4'55" | 7'27" | 6'36" | 15'42" |
|  | Curing time | 14'56" | 16'24" | 16'38" | 17'57" | 7'30" | 9'24" | 9'55" | 8'25" | 10'58" | 10'36" | 38'10" |
| 10° C. | Gel time | 1'45" | 2'05" | 2'10" | 2'40" | 2'29" | 3'52" | 4'22" | 3'23" | 5'36" | 4'50" | 10'38" |
|  | Curing time | 11'03" | 12'23" | 12'36" | 13'26 | 5'04" | 7'12" | 7'34" | 6'03" | 8'26" | 8'08" | 23'30" |
| 15° C. | Gel time | 1'02" | 1'26" | 1'34" | 2'03" | 1'56" | 2'57" | 3'18" | 2'34" | 4'24" | 3'46" | 6'20" |
|  | Curing time | 8'00" | 8'32" | 8'47" | 9'29" | 3'23" | 4'59" | 5'20" | 4'06" | 6'21" | 6'02" | 12'33" |
| 20° C. | Gel time | 54" | 57" | 1'05" | 1'32" | 1'25" | 2'20" | 2'41" | 2'02" | 3'20" | 3'05" | 4'25" |
|  | Curing time | 5'45" | 6'06" | 6'20" | 6'50" | 2'30" | 3'30" | 3'52" | 3'03" | 4'38" | 4'20" | 7'47" |

The gel time is calculated from the stirring to the occurrence of gel. The curing time is calculated from the stirring to the formation of a cured resin having certain hardness, which is total of the gel time and the shaping time.

Data in Table 1 correspond to FIGS. 1-4.

Figure 2:
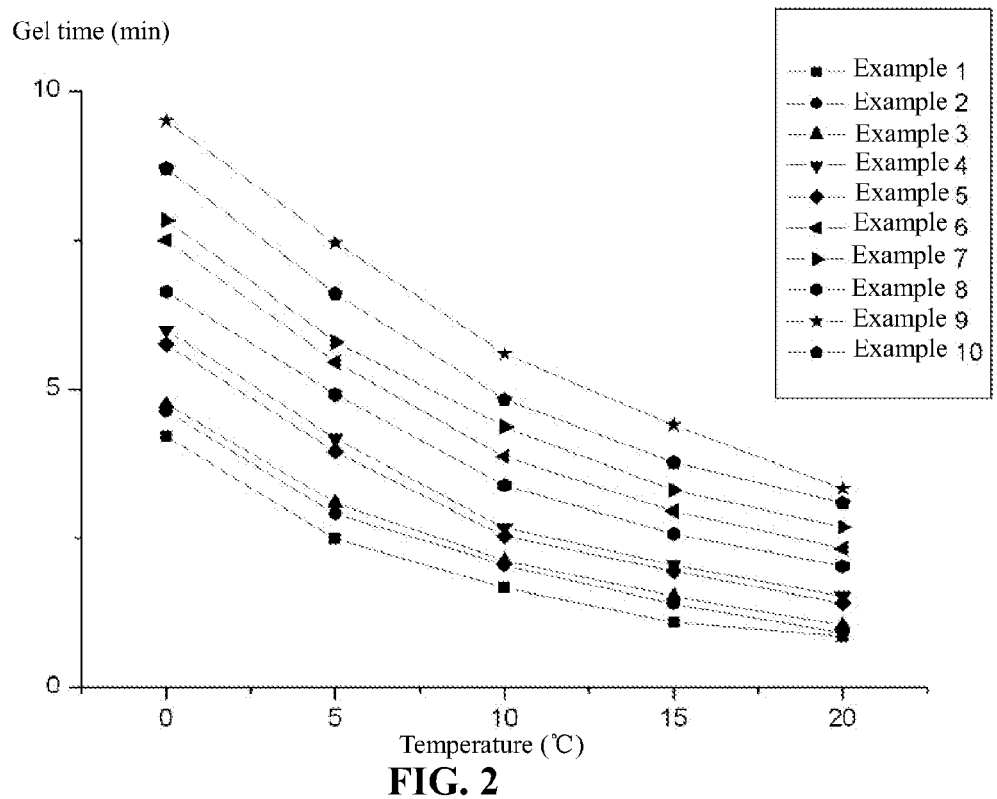
FIG. 2 is a local enlarged view of FIG. 1.

As shown in FIGS. 1-2, the initiator compositions in Examples 1-10 can significantly shorten the gel time of unsaturated polyester resins at low and normal temperatures.

Figure 3:
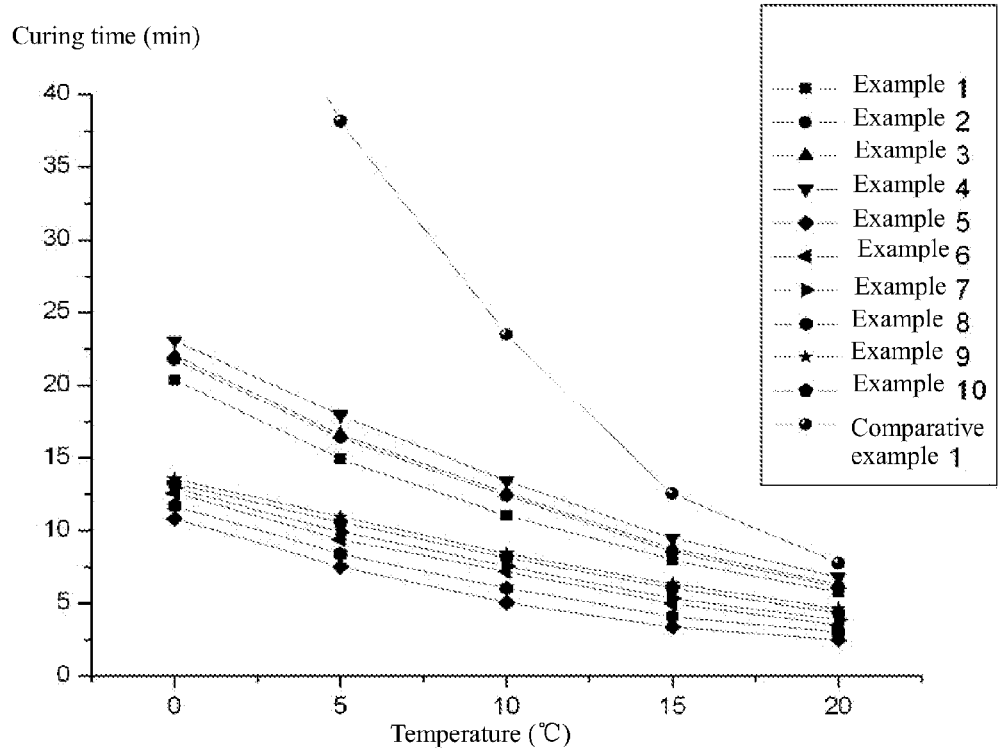
FIG. 3 is a curve chart of a curing time of unsaturated polyester resins initiated by an initiator composition of the invention at different temperatures.
Figure 4:
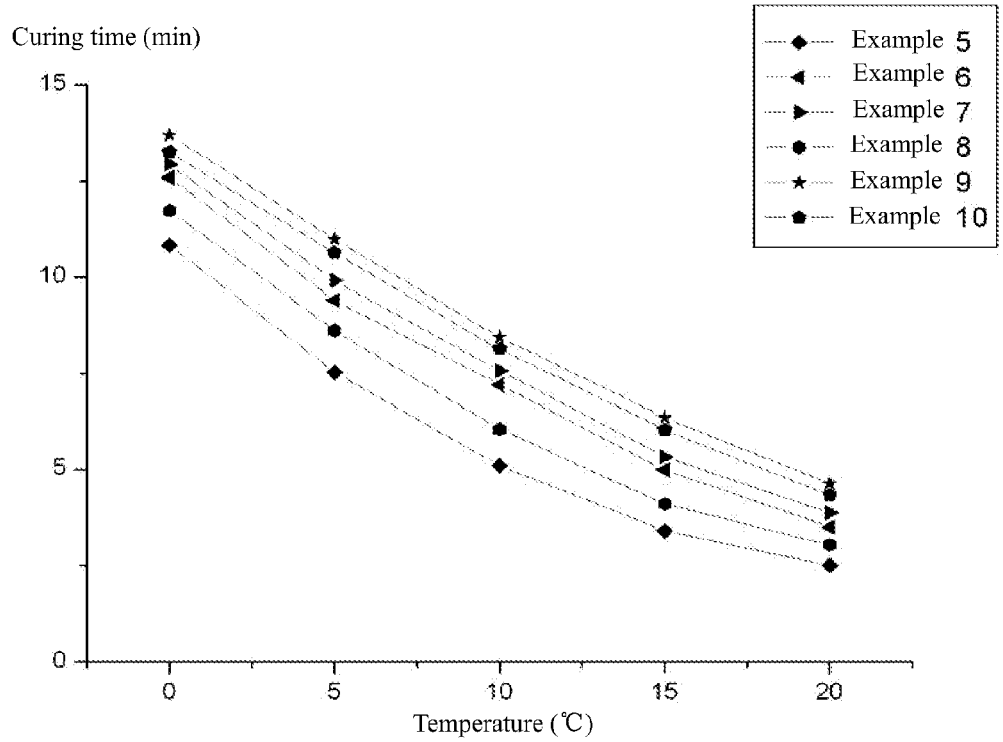
FIG. 4 is a local enlarged view of FIG. 3.

As shown in FIGS. 3-4, the initiator compositions in Examples 1-10 can significantly shorten the curing time of unsaturated polyester resins at low and normal temperatures.

As shown in FIGS. 1 and 3, in Examples 1-4 and the comparative example 1, the gel time is significantly shortened, but the curing time is long, which does not benefit the construction; in Examples 5-10 and the comparative example 1, both the gel time and the curing time are significantly shortened, which is beneficial to the construction.

TABLE 2

Barcol hardness, bending strength, and impact strength of cured resin at 5° C.

| Items | Example 1 | Example 2 | Example 3 | Example 4 | Example 5 | Example 6 | Example 7 | Example 8 | Example 9 | Example 10 | Comparative example 1 |
|---|---|---|---|---|---|---|---|---|---|---|---|
| Barcol hardness | 48 | 49 | 47 | 45 | 50 | 48 | 46 | 47 | 45 | 46 | 32 |
| Bending strength (MPa) | 120 | 123 | 121 | 116 | 124 | 123 | 118 | 120 | 118 | 117 | 97 |
| Impact strength (kJ/m$^2$) | 2.9 | 2.8 | 2.9 | 2.5 | 2.8 | 2.7 | 2.8 | 2.8 | 2.6 | 2.7 | 1.8 |

Data in Table 2 show that the initiator composition can significantly improve the degree of cure of unsaturated polyester resins at low temperatures, and improve the mechanical properties of cured resins.

EXAMPLE 11

At 30° C., 100 g of m-type unsaturated polyester resin No. 199APT-1 from Jiangsu Yabang Coating Co., Ltd., 0.1 g of methyl hydroquinone (technical grade), and 0.1 g of N,N-diethylaniline (technical grade) were uniformly mixed. Thereafter, 0.3 g of the initiator composition No. 1 was added to the mixture, and still being cured after mixed.

The cured resin was allowed to stand at 30° C. for 96 hours. Thereafter, the Barcol hardness of the cured resin was measured using the Barcol hardmeter (Beijing Shidaishanfeng Technology Co., HBA-1) according to Chinese National Standard GB/T 3854-2005, the bending strength of the cured resin was measured using the computer-controlled electronic universal testing machine (Shenzhen Reger Instrument Co., Ltd, RGM-100) according to Chinese National Standard GB/T 2570-1995, and the impact strength of the cured resin was measured using the electronic combination-type impact testing machine (Chengde Jingmi Precision Testing Machine Co., Ltd., XJC-25D) according to Chinese National Standard GB/T 2571-1995. The results are listed in Table 3.

TABLE 3

| Items | Barcol hardness | Bending strength (MPa) | Impact strength (kJ/m$^2$) |
|---|---|---|---|
| Example 11 | 44 | 118 | 2.5 |

EXAMPLE 12

At 5° C., 100 g of dicyclopentadiene unsaturated polyester resin No. 946 from Jiangsu Yabang Coating Co., Ltd., 0.01 g of 2,5-di-tert-butyl hydroquinone (technical grade), and 1 g of N-methyl-N-hydroxyethyl aniline (technical grade) were uniformly mixed. Thereafter, 3 g of the initiator composition No. 3 was added to the mixture, and still being cured after mixed.

The cured resin was allowed to stand at 5° C. for 96 hours. The methods for measuring the Barcol hardness of the cured resin, the bending strength of the cured resin, and the impact strength of the cured resin are same as the eleventh example. The results are listed in Table 4.

TABLE 4

| Items | Barcol hardness | Bending strength (MPa) | Impact strength (kJ/m$^2$) |
|---|---|---|---|
| Example 12 | 43 | 121 | 2.3 |

EXAMPLE 13

At 15° C., 100 g of m-type unsaturated polyester resin No. 199APT-1 from Jiangsu Yabang Coating Co., Ltd., 0.02 g of 4-tert-butylcatechol (technical grade), and 0.8 g of N-methyl-N-hydroxyethyl p-toluidine (technical grade) were uniformly mixed. Thereafter, 2 g of the initiator composition No. 5 was added to the mixture, and still being cured after mixed.

The cured resin was allowed to stand at 15° C. for 96 hours. The methods for measuring the Barcol hardness of the cured resin, the bending strength of the cured resin, and the impact strength of the cured resin are same as the eleventh example. The results are listed in Table 5.

TABLE 5

| Items | Barcol hardness | Bending strength (MPa) | Impact strength (kJ/m$^2$) |
|---|---|---|---|
| Example 13 | 46 | 123 | 2.6 |

EXAMPLE 14

At 28° C., 100 g of vinyl ester resin No. VER-2 from Jiangsu Yabang Coating Co., Ltd., 0.08 g of p-benzoquinone (technical grade), and 0.2 g of N,N-dihydroxyethyl aniline (technical grade) were uniformly mixed. Thereafter, 0.5 g of the initiator composition No. 7 was added to the mixture, and still being cured after mixed.

The cured resin was allowed to stand at 28° C. for 96 hours. The methods for measuring the Barcol hardness of the cured resin, the bending strength of the cured resin, and the impact strength of the cured resin are same as the eleventh example. The results are listed in Table 6.

TABLE 6

| Items | Barcol hardness | Bending strength (MPa) | Impact strength (kJ/m$^2$) |
|---|---|---|---|
| Example 14 | 45 | 125 | 2.5 |

EXAMPLE 15

At 20° C., 100 g of bisphenol A-type unsaturated polyester resin No. 3301 from Jiangsu Yabang Coating Co., Ltd., 0.03 g of hydroquinone (technical grade), and 0.5 g of N-methyl-N-hydroxypropyl p-toluidine (technical grade) were uniformly mixed. Thereafter, 1.5 g of the initiator composition No. 9 was added to the mixture, and still being cured after mixed.

The cured resin was allowed to stand at 20° C. for 96 hours. The methods for measuring the Barcol hardness of the cured resin, the bending strength of the cured resin, and the impact strength of the cured resin are same as the eleventh example. The results are listed in Table 7.

TABLE 7

| Items | Barcol hardness | Bending strength (MPa) | Impact strength (kJ/m$^2$) |
|---|---|---|---|
| Example 15 | 49 | 127 | 2.9 |

It should be noted that the initiator composition and the unsaturated polyester resin (the inhibitor and the accelerator have been added) should be stored independently, and mixed in use.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An initiator composition for expediting the curing of an unsaturated polyester resin at room temperature, the initiator composition comprising:
   at least two diacyl peroxides; and
   a carboxylic ester peroxide;

wherein:
the two diacyl peroxides are selected from the group consisting of benzoyl peroxide, 2,4-dichlorobenzene acyl peroxide, lauroyl peroxide, and diacetyl peroxide; and
the carboxylic ester peroxide is selected from the group consisting of tert-butyl peroxybenzoate (TBPB), tert-butyl peroxy diethyl acetate, and t-butyl peroctoate (TBPO).

2. The initiator composition of claim 1, comprising between 50 and 95 parts by weight of the two diacyl peroxides and between 5 and 50 parts by weight of the carboxylic ester peroxide.

3. The initiator composition of claim 2, comprising between 75 and 95 parts by weight of the two diacyl peroxides and between 5 and 25 parts by weight of the carboxylic ester peroxide.

4. The initiator composition of claim 1, wherein the initiator composition further comprises an additional compound selected from the group consisting of dicumyl peroxide, di-t-butyl peroxide, and t-butyl cumyl peroxide.

5. The initiator composition of claim 4, comprising between 75 and 90 parts by weight of the two diacyl peroxides, between 5 and 20 parts by weight of the carboxylic ester peroxide, and between 5 and 20 parts by weight of the additional compound.

6. The initiator composition of claim 5, wherein the diacyl peroxides are 80 parts by weight, the carboxylic ester peroxide is 10 parts by weight, and the additional compound is 10 parts by weight, the diacyl peroxides comprise 40 parts by weight of benzoyl peroxide and 40 parts by weight of 2,4-dichlorobenzene acyl peroxide, the carboxylic ester peroxide is tert-butyl peroxybenzoate, and the additional compound is dicumyl peroxide.

7. A method for expediting the curing of an unsaturated polyester resin at room temperature, the method comprising adding an initiator composition of claim 1 to the unsaturated polyester resin, wherein the unsaturated polyester resin is selected from the group consisting of phthalandione type unsaturated polyester resin, isophthalic unsaturated polyester resin, bisphenol A-type unsaturated polyester resin, dicyclopentadiene unsaturated polyester resin, hexachloro-endo-methylenetetrahydrophthalic acid-based unsaturated polyester acetate resin, vinyl ester resin, and allyl resin.

8. A composition, comprising an unsaturated polyester resin, an initiator composition of claim 1, an inhibitor, and an accelerator.

9. The composition of claim 8, wherein the inhibitor is selected from the group consisting of hydroquinone, 2,5-di-tert-butyl hydroquinone, methyl hydroquinone, p-benzoquinone, 4-tert-butylcatechol, and the accelerator is selected from the group consisting of N, N-dimethyl aniline, N, N-diethylaniline, N, N-dimethyl-p-toluidine, N-methyl-N-hydroxyethyl aniline, N-methyl-N-hydroxyethyl p-toluidine, N-methyl-N-hydroxypropyl p-toluidine, N, N-dihydroxyethyl aniline, and a homologue thereof.

10. The composition of claim 9, comprising 100 parts by weight of the unsaturated polyester resin, between 0.3 and 3 parts by weight of the initiator composition, between 0.01 and 0.1 part by weight of the inhibitor, and between 0.1 and 1 part by weight of the accelerator.

11. The composition of claim 10, comprising 100 parts by weight of the unsaturated polyester resin, between 0.5 and 2 parts by weight of the initiator composition, between 0.02 and 0.08 part by weight of the inhibitor, and between 0.2 and 0.8 part by weight of the accelerator.

12. The composition of claim 11, comprising 100 parts by weight of the unsaturated polyester resin, 1.5 parts by weight of the initiator composition, 0.03 part by weight of the inhibitor, and 0.5 part by weight of the accelerator.

13. The initiator composition of claim 1, wherein the initiator composition expedites curing of an unsaturated polyester resin at a temperature not higher than 15° C.

14. The method of claim 7, wherein the initiator composition is added to the unsaturated polyester resin at a temperature not higher than 15° C.

15. An initiator composition, comprising 75 parts by weight of diacyl peroxide and 25 parts by weight of carboxylic ester peroxide, wherein the diacyl peroxide comprises 25 parts by weight of benzoyl peroxide, 20 parts by weight of 2,4-dichlorobenzene acyl peroxide, 15 parts by weight of lauroyl peroxide, and 15 parts by weight of diacetyl peroxide, and the carboxylic ester peroxide is t-butyl peroctoate (TBPO).

16. An initiator composition, comprising 95 parts by weight of diacyl peroxide and 5 parts by weight of carboxylic ester peroxide, wherein the diacyl peroxide comprises 40 parts by weight of the benzoyl peroxide, 30 parts by weight of 2,4-dichlorobenzene acyl peroxide, and 25 parts by weight of lauroyl peroxide, and the carboxylic ester peroxide is tert-butyl peroxy diethyl acetate.

17. An initiator composition, comprising 90 parts by weight of diacyl peroxide and 10 parts by weight of carboxylic ester peroxide, wherein the diacyl peroxide comprises 40 parts by weight of benzoyl peroxide and 50 parts by weight of 2,4-dichlorobenzene acyl peroxide, and the carboxylic ester peroxide is tert-butyl peroxybenzoate (TBPB).

\* \* \* \* \*